(12) United States Patent
Abramovsky et al.

(10) Patent No.: US 12,267,746 B2
(45) Date of Patent: Apr. 1, 2025

(54) CSFB WITH RIM WITHOUT NETWORK SUPPORT

(71) Applicant: Parallel Wireless, Inc., Nashua, NH (US)

(72) Inventors: Benjamin Abramovsky, Petah Tiqwa (IL); Nimrod Gradus, Givatayim (IL); Ido Shaked, Alfei Menashe (IL); Jose Salas, London (GB)

(73) Assignee: Parallel Wireless, Inc., Nashua, NH (US)

( * ) Notice: Subject to any disclaimer, the term of this patent is extended or adjusted under 35 U.S.C. 154(b) by 310 days.

(21) Appl. No.: 17/734,181

(22) Filed: May 2, 2022

(65) Prior Publication Data
US 2022/0353751 A1 Nov. 3, 2022

Related U.S. Application Data

(60) Provisional application No. 63/182,081, filed on Apr. 30, 2021.

(51) Int. Cl.
*H04W 36/30* (2009.01)
*H04W 36/00* (2009.01)
*H04W 36/14* (2009.01)

(52) U.S. Cl.
CPC ... *H04W 36/305* (2018.08); *H04W 36/00224* (2023.05); *H04W 36/1446* (2023.05)

(58) Field of Classification Search
CPC ......... H04W 36/00224; H04W 36/305; H04W 36/1446; H04W 36/0066; H04W 36/00226; H04W 36/0022; H04W 36/0033
See application file for complete search history.

(56) References Cited

U.S. PATENT DOCUMENTS

| | | | |
|---|---|---|---|
| 8,477,621 B2 | 7/2013 | Janakiraman et al. |
| 8,565,187 B2 | 10/2013 | Lee |
| 8,879,416 B2 | 11/2014 | Mishra et al. |
| 9,049,634 B2 | 6/2015 | Hsu |

(Continued)

OTHER PUBLICATIONS

European Telecommunications Standards Institute, ETSI TS 136 331 v12.10.0 (Aug. 2016), "LTE; Evolved Universal Terrestrial Radio Access (E-UTRA); Radio Resource Control (RRC); Protocol Specification (3GPP TS 36.331 version 12.10.0 Release 12)", Aug. 2016, V12.10.0.

(Continued)

*Primary Examiner* — Allahyar Kasraian
(74) *Attorney, Agent, or Firm* — Michael Y. Saji

(57) ABSTRACT

A method and system for providing Circuit Switch Fall Back (CSFB) with Radio Access Network (RAN) Information Management (RIM) without network support is presented. In one embodiment, a method includes receiving, by a coordinating server, direct information transfer System Information (SI) messages with RIM Packet Data Unit (PDU) from an eNodeB; sending, by the coordinating server, a RAN-information-request message to a relevant cell, using the routing information in the RIM PDU; collecting and replaying by the cell the SI needed for CFSB to the coordinating server; storing, by the coordinating server, the latest SI information per cell; and replaying, by the coordinating server, the eNodeB with the stored SI information using a MME direct information transfer S1 message.

20 Claims, 8 Drawing Sheets

(56) References Cited

U.S. PATENT DOCUMENTS

| | | | |
|---|---|---|---|
| 9,113,352 B2 | 8/2015 | Agarwal et al. | |
| 9,185,584 B1* | 11/2015 | Ramamurthy | H04W 24/04 |
| 9,491,801 B2 | 11/2016 | Donepudi et al. | |
| 2002/0193139 A1 | 12/2002 | Mildh et al. | |
| 2004/0082328 A1 | 4/2004 | Japenga et al. | |
| 2008/0222294 A1 | 9/2008 | Liang | |
| 2010/0130205 A1 | 5/2010 | Jung et al. | |
| 2010/0329210 A1 | 12/2010 | Shirota et al. | |
| 2012/0063414 A1 | 3/2012 | Ramachandran | |
| 2012/0064896 A1* | 3/2012 | Guo | H04W 36/22 |
| | | | 455/436 |
| 2012/0135731 A1 | 5/2012 | Rangaiah et al. | |
| 2012/0300639 A1 | 11/2012 | Janakiraman et al. | |
| 2013/0034080 A1 | 2/2013 | Yang et al. | |
| 2013/0329567 A1 | 12/2013 | Mathias et al. | |
| 2014/0064156 A1 | 3/2014 | Paladugu et al. | |
| 2014/0080447 A1 | 3/2014 | Janakiraman | |
| 2014/0092765 A1 | 4/2014 | Agarwal et al. | |
| 2014/0206305 A1 | 7/2014 | Wong et al. | |
| 2015/0172959 A1* | 6/2015 | Cucala Garcia | H04W 92/02 |
| | | | 455/436 |
| 2015/0257051 A1 | 9/2015 | Rao et al. | |
| 2015/0358972 A1* | 12/2015 | Lee | H04W 48/18 |
| | | | 370/329 |
| 2016/0044531 A1 | 2/2016 | Papa et al. | |
| 2016/0044545 A1 | 2/2016 | Yang et al. | |
| 2016/0057671 A1 | 2/2016 | Yang et al. | |
| 2016/0135132 A1 | 5/2016 | Donepudi et al. | |
| 2016/0157142 A1 | 6/2016 | Koskinen et al. | |
| 2016/0183156 A1* | 6/2016 | Chin | H04L 61/5007 |
| | | | 370/331 |
| 2016/0212755 A1 | 7/2016 | Cao et al. | |
| 2016/0277991 A1 | 9/2016 | Yang et al. | |
| 2016/0277992 A1 | 9/2016 | Cao | |
| 2017/0013513 A1 | 1/2017 | Agarwal et al. | |
| 2017/0273134 A1 | 9/2017 | Cao et al. | |
| 2018/0152865 A1 | 5/2018 | Atri et al. | |
| 2019/0327702 A1* | 10/2019 | Wang | H04W 68/02 |

OTHER PUBLICATIONS

Circuit-Switched Fallback. The first phase of voice evolution for mobile LTE devices, Qualcomm, May 18, 2012 retrieved from https://www.ericsson.com/assets/local/news/2012/5/the_first_phase_of_voice_evolution_for_mobile_lie_devices. pdf.

Ghadialy, "Circuit Switched Fallback (CSFB): A Quick Primer," The 3G4G Blog, Feb. 23, 2011, retrieved from https://blog.3g4g.co.uk/2011/02/circuit-switched-fallback-csfb-quick.hlml.

3RD Generation Partnership Project, 3GPP TS 36.331 V11.16.0 (Jun. 2016), "3rd Generation Partnership Project; Technical Specification Group Radio Access Network; Evolved Universal Terrestrial Radio Access (E-UTRA); Radio Resource Control (RRC); Protocol Specification (Release 11)", Jun. 2016, V11.16.0.

* cited by examiner

CSFB WITH RIM WITHOUT NETWORK SUPPORT

CROSS-REFERENCE TO RELATED APPLICATIONS

This application claims priority under 35 U.S.C. § 119(e) to U.S. Provisional Pat. App. No. 63/182,081, filed Apr. 30, 2021, titled "CSFB With RIM Without Network Support" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828427, U.S. Pat. App. Pub. Nos. US20170273134A1, US20170127409A1 in their entirety.

BACKGROUND

When a voice call is about to be established in a 4G cell and neither the 4G Network nor the UE does not support VoLTE, the 4G network sends the UE to another RAN in order to establish the voice call (CSFB—Circuit Switch Fall Back). This mobility procedure may take some time as the UE needs to search a cell in another RAT and also capture the System Information of the target cell.

The main delay in call setup time is due to cell acquisition on the RAT target cell before resuming the call.

SUMMARY

In one embodiment a method for providing Circuit Switch Fall Back (CSFB) with RAN Information Management (RIM) without network support includes sending, by an eNodeB, direct information transfer S1 messages with RIM PDU to a HetNet Gateway (HNG); sending, by the HNG, a ran-information-request message to a relevant 2G cell, using the routing information in the RIM PDU; collecting, by the 2G cell, (System Information) SI needed for CFSB and replaying the SI to the HNG; storing, by the HNG, the latest SI information per 2G cell; and replaying, by the HNG, the eNodeB with the stored SI information using a MME direct information transfer S1 message.

In another embodiment a system for providing Circuit Switch Fall Back (CSFB) with Radio Access Network (RAN) Information Management (RIM) without network support, includes a coordinating server network device; wherein the coordinating server receives direct information transfer System Information (SI) messages with RIM Packet Data Unit (PDU) from an eNodeB; wherein the coordinating server sends a RAN-information-request message to a relevant cell, using the routing information in the RIM PDU; wherein the cell collects and replays the SI needed for CFSB to the coordinating server; wherein the coordinating server saves the latest SI information per cell; and wherein the coordinating server replays the eNodeB with the stored SI information using a MME direct information transfer S1 message.

DETAILED DESCRIPTION

The present description uses 2G as an example network technology for CFSB, though it should be understood that other network technologies could also be used. A way to improve the time it takes to establish the voice call in another RAT, the source 4G cell can provide the UE with the System Information of the target cell, so the UE does not need to search for a target cell and to capture the System Information.

Figure 1:
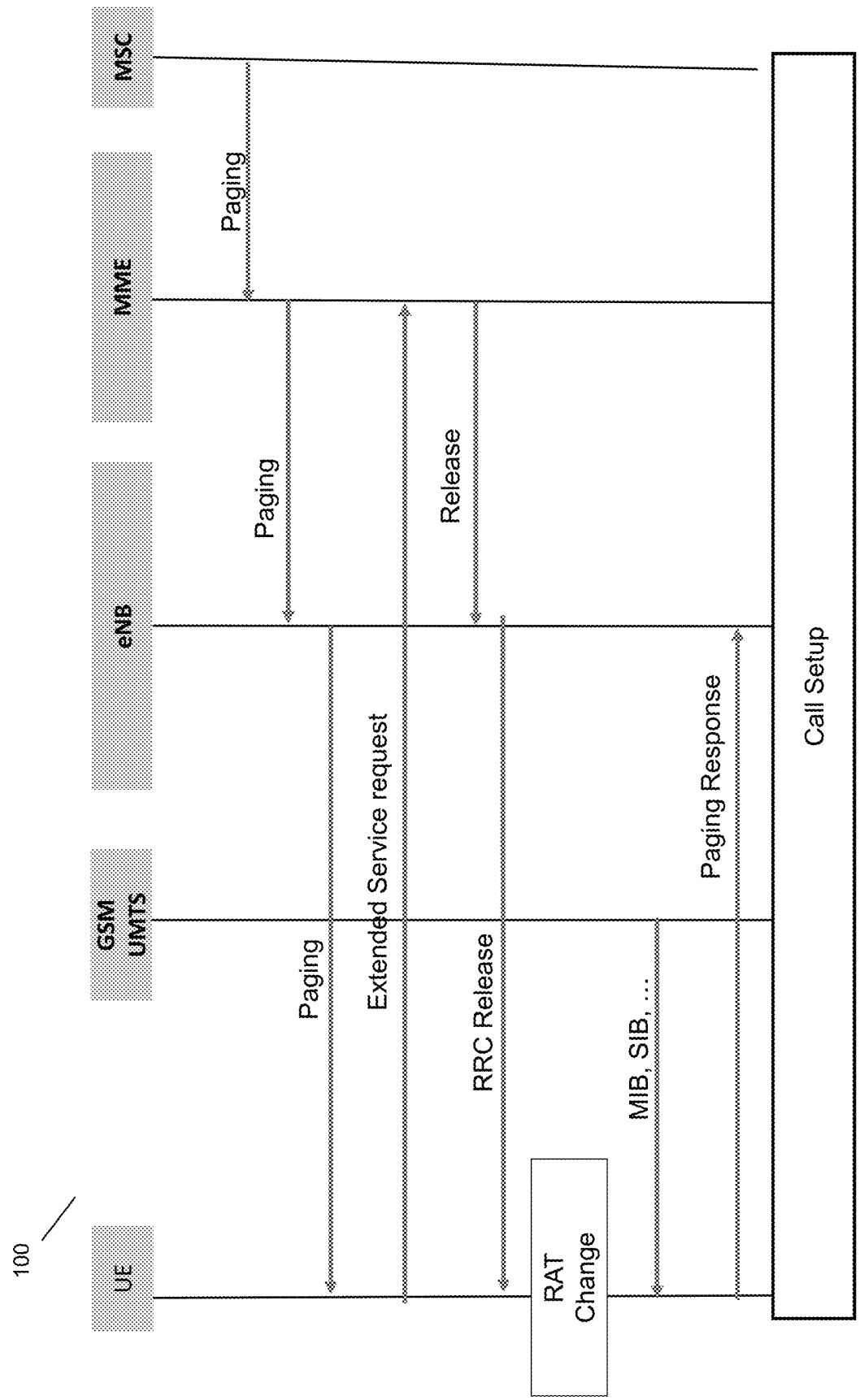
FIG. 1 is a diagram of a CSFB call setup from LTE, in accordance with some embodiments.

Instead of the original call flow 100 as shown in FIG. 1 involving the operator core network entities, the coordinating server (e.g. a HetNet Gateway (HNG)) itself will route the RIM messages between the 4G eNodeB and the other RAT cell (2G/3G).

RAN Information Management (RIM) procedure allows the transfer of information between a source BSS and target BSS via the core network.

Figure 2:
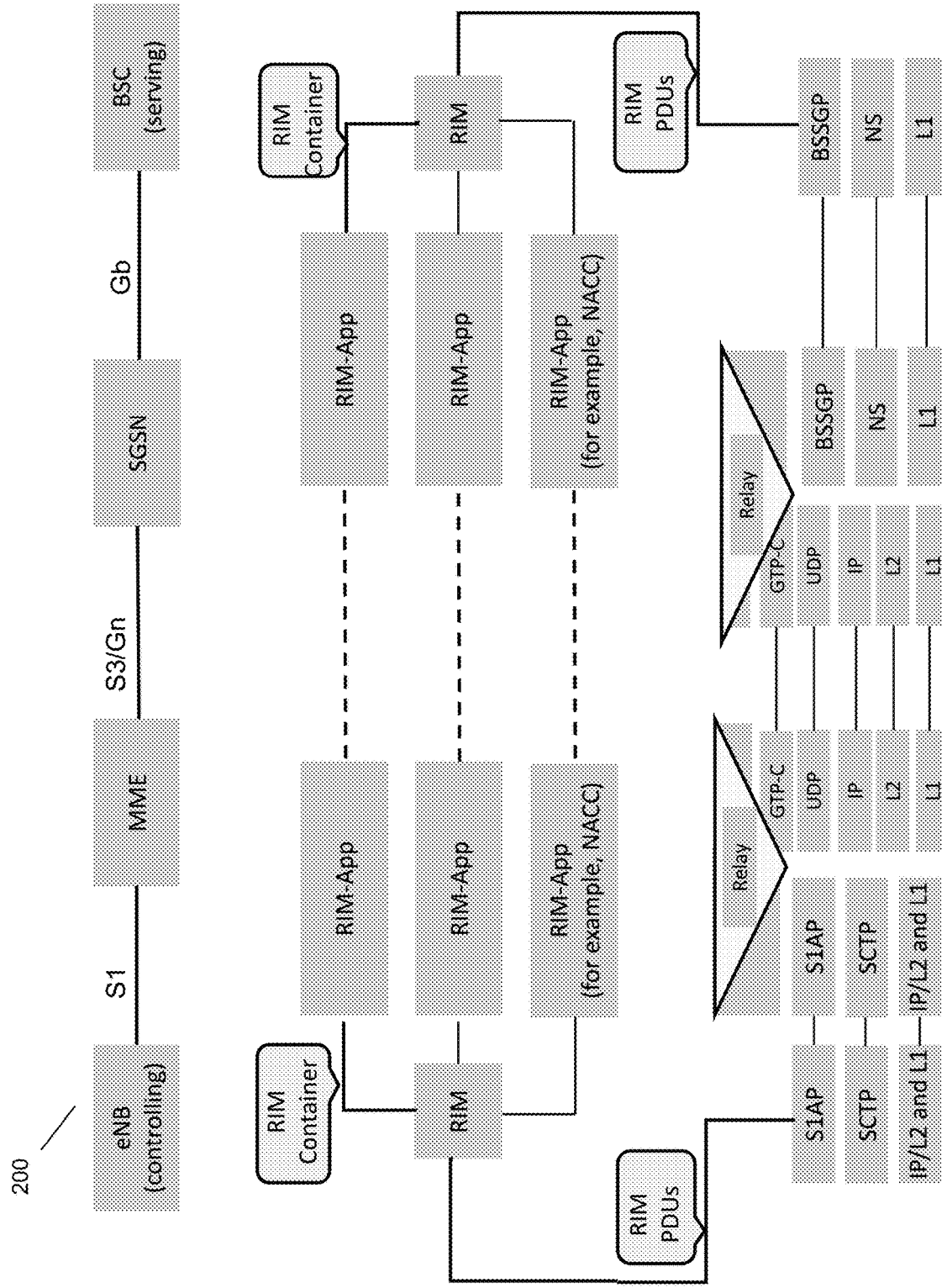
FIG. 2 is a diagram of signaling messages used in a RIM protocol, in accordance with some embodiments.

The signaling messages used in the RAN Information Management (RIM) protocol are called RIM PDU's and they are defined in TS48.018 and shown in the call flow 200 of FIG. 2

RIM must be supported by the network due to the connection required from the MME to the SGSN. Most vendors and network operators does not support RIM, and this is the reason why it's not widely used.

Instead of the original flow a involving the operator core network entities, the HNG itself will route the RIM messages between the 4G eNodeB and the other RAT cell (2G/3G).

Upon boot, PW's eNodeB will send eNodeB direct information transfer S1 messages with RIM PDU to the HNG, a single message for each 2G neighbor in the eNodeB NRT (neighbor relation table)

HNG will send ran-information-request message to the relevant 2G cell, using the routing information in the RIM PDU. The 2G cell will collect the SI (System Information) needed for CFSB (SI 3) and will replay the HNG. The HNG will store the latest SI information per 2G cell.

In case SI configurations changed (will be done from HNG), HNG will mark this cell as "SI fetch needed". In case CFSB was triggered at the 4G cell, 4G cell will send eNodeB direct information transfer S1 message to the HNG.

In case the target cell SI fetch status is not "SI fetch needed", HNG will replay with the stored SI information using MME direct information transfer S1 message.

In case "SI fetch is needed" HNG will send the ran-information-request message to the relevant 2G cell.

2G cell will collect the SI (System Information) needed for CFSB (SI 3) and will replay the HNG.

HNG will store the latest SI information per 2G cell

HNG will replay to the eNodeB with the stored SI information using MME direct information transfer S1 message.

Figure 3:
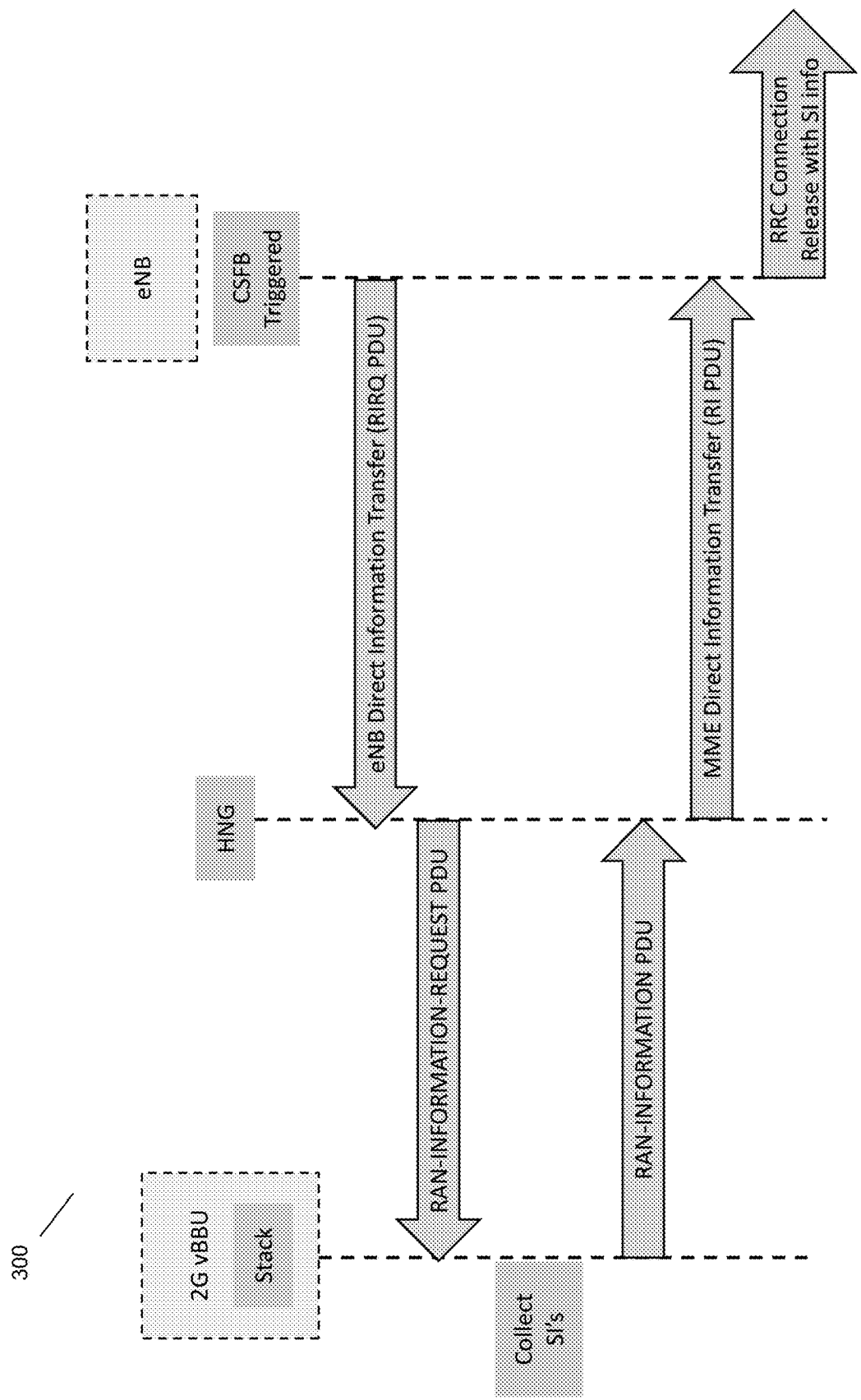
FIG. 3 is a diagram showing the HNG routing RIM messages between 4G eNodeB and other RAT cells, in accordance with some embodiments.

The signaling is shown in the call flow 300 of FIG. 3.

Figure 4A:
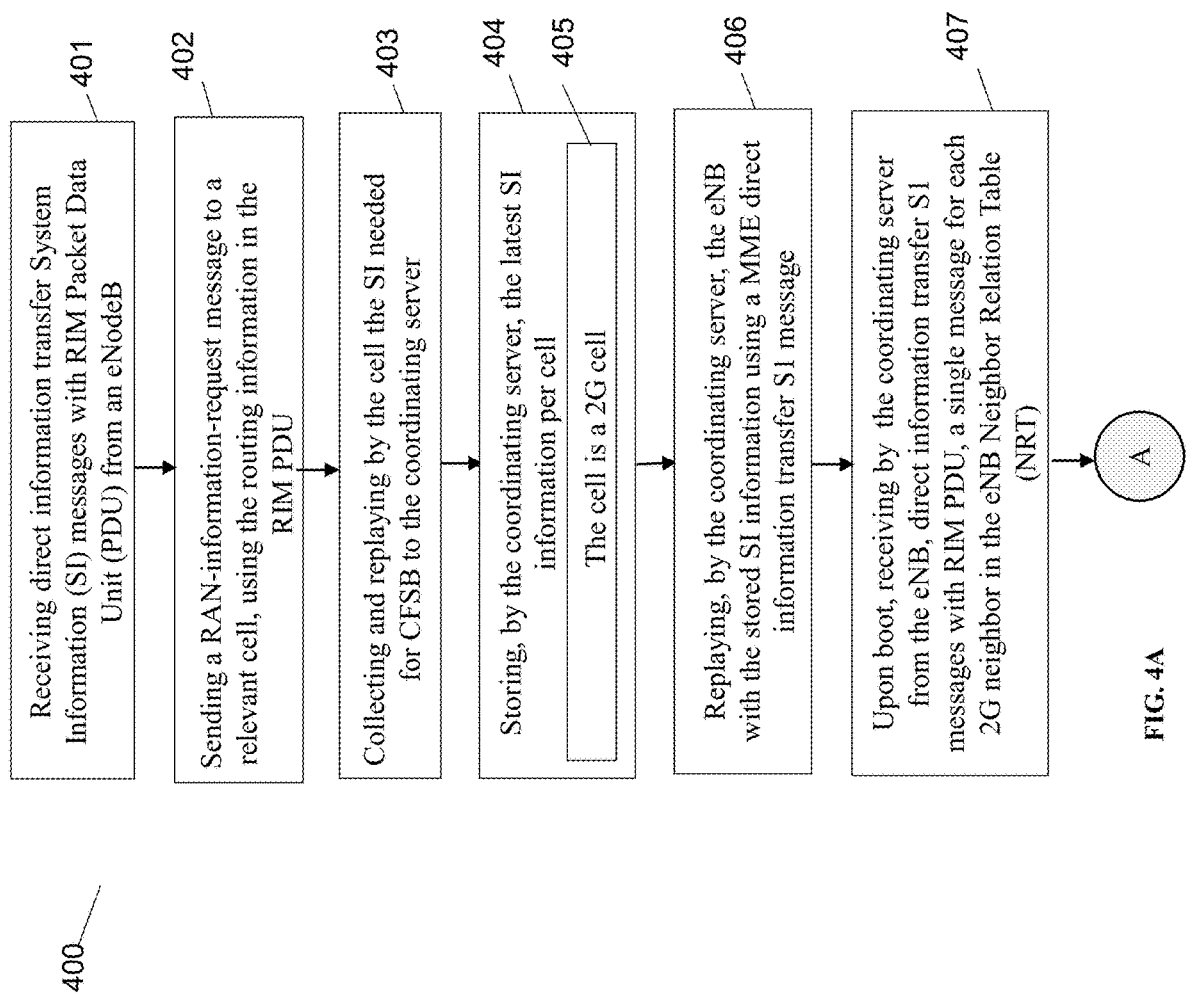
FIGS. 4A and 4B are a flow diagram of an example method for providing CSFB with RIM without network support, in accordance with some embodiments.
Figure 4B:
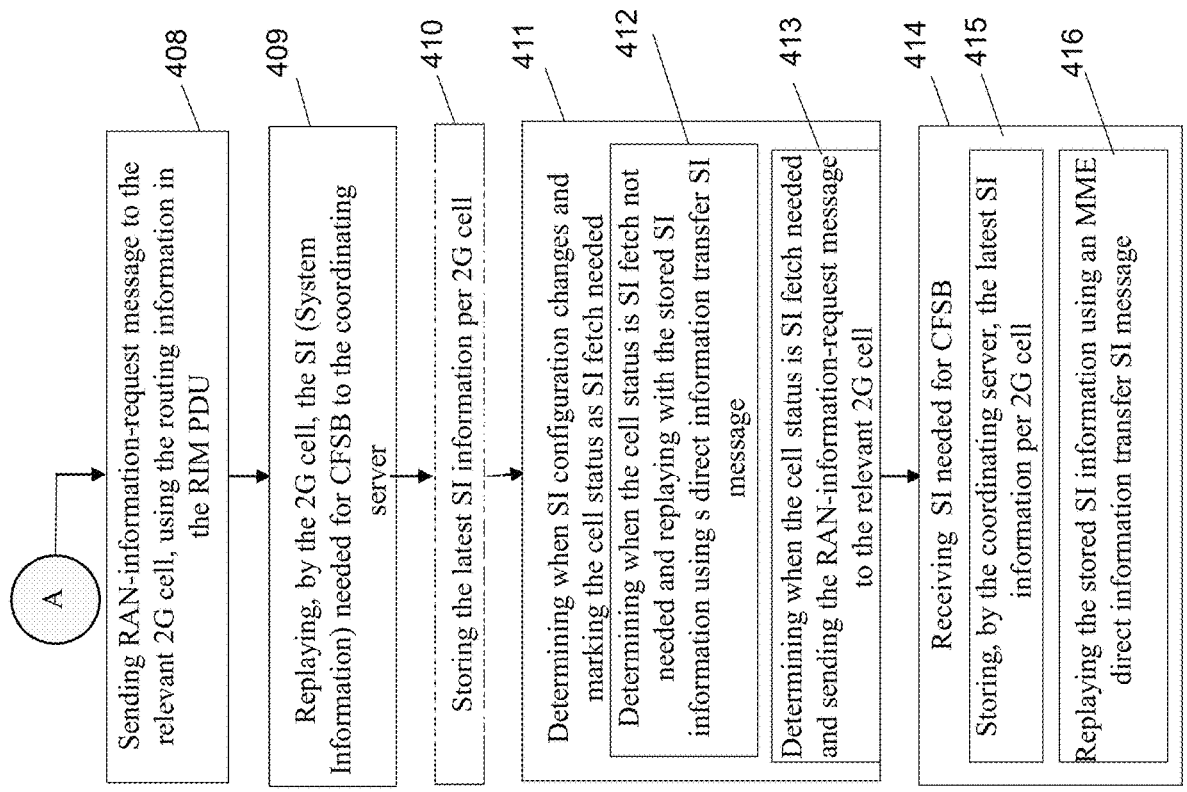

A flow chart of a particular embodiment of the presently disclosed method is depicted in FIGS. 4A and 4B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

An embodiment will be described from the point of view of the coordinating server. Beginning with the flow diagram labeled FIG. 4A, a method 400 for providing Circuit Switch Fall Back (CSFB) with Radio Access Network (RAN) Information Management (RIM) without network support begins with processing block 401 which describes receiving direct information transfer System Information (SI) messages with RIM Packet Data Unit (PDU) from an eNodeB.

Processing block 402 states sending a RAN-information-request message to a relevant cell, using the routing information in the RIM PDU. Processing block 403 recites collecting and replaying by the cell the SI needed for CFSB to the coordinating server.

Processing block 404 discloses storing, by the coordinating server, the latest SI information per cell. As shown in processing block 405, in some embodiment the cell is a 2G cell.

Processing block 406 shows replaying the eNodeB with the stored SI information using a MME direct information transfer S1 message. Processing block 407 discloses wherein upon boot, receiving by the coordinating server from the eNodeB, direct information transfer S1 messages with RIM PDU, a single message for each 2G neighbor in the eNodeB Neighbor Relation Table (NRT).

Processing continues with processing block 408 as shown in FIG. 4B where sending RAN-information-request message to the relevant 2G cell, using the routing information in the RIM PDU. Processing block 409 discloses replaying, by the 2G cell, the SI (System Information) needed for CFSB to the coordinating server. Processing block 410 states storing the latest SI information per 2G cell.

Processing block 411 recites determining when SI configuration changes and marking the cell status as SI fetch needed. Processing block 412 discloses determining when the cell status is SI fetch not needed and replaying with the stored SI information using s direct information transfer SI message, and processing block 413 recites determining when the cell status is SI fetch needed and sending the RAN-information-request message to the relevant 2G cell.

Processing block 414 discloses receiving an SI needed for CFSB. Processing block 415 shows storing the latest SI information per 2G cell. Processing block 416 recites replaying to the eNodeB, the stored SI information using an MME direct information transfer SI message.

Figure 5:
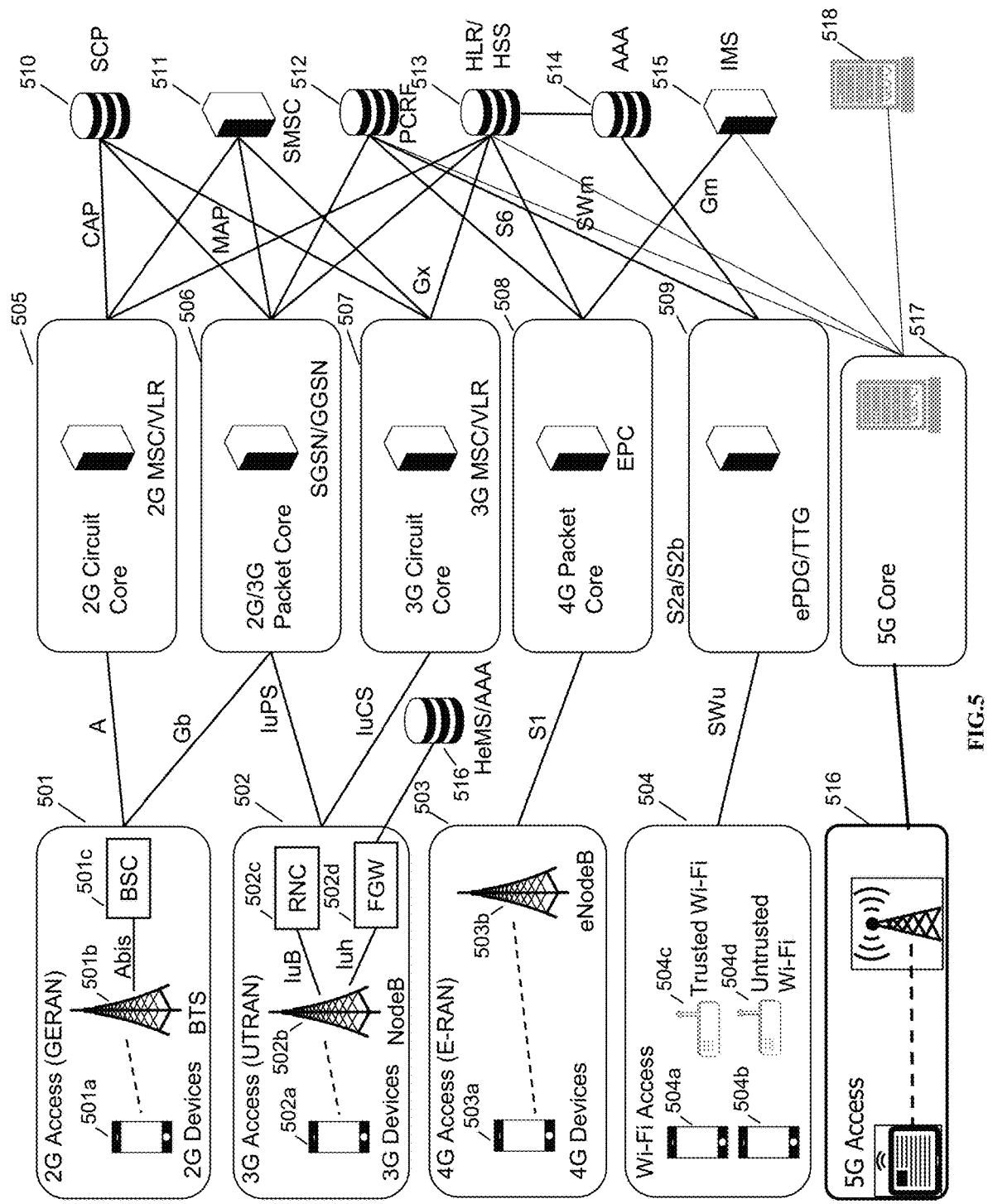
FIG. 5 is a schematic network architecture diagram for 3G and other-G prior art networks.

FIG. 5 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 5G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 5G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non- "G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501c is required for Abis compatibility with BTS 501b, while for the 3G UTRAN, an RNC 502c is required for Iub compatibility and an FGW 502d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 6:
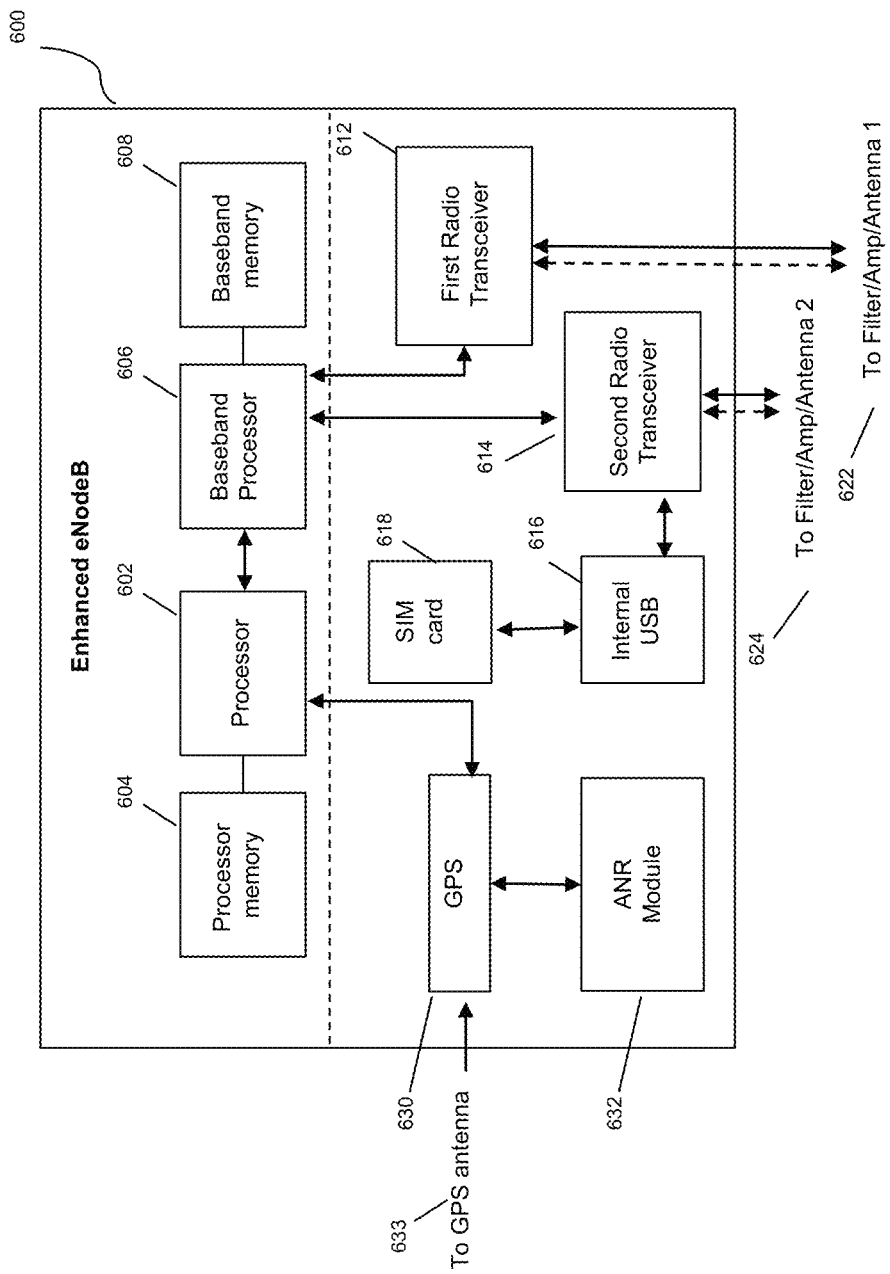
FIG. 6 is an enhanced eNodeB for performing the methods described herein, in accordance with some embodiments.

FIG. 6* is a diagram of an enhanced eNodeB for performing the methods described herein, in accordance with some embodiments. eNodeB 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
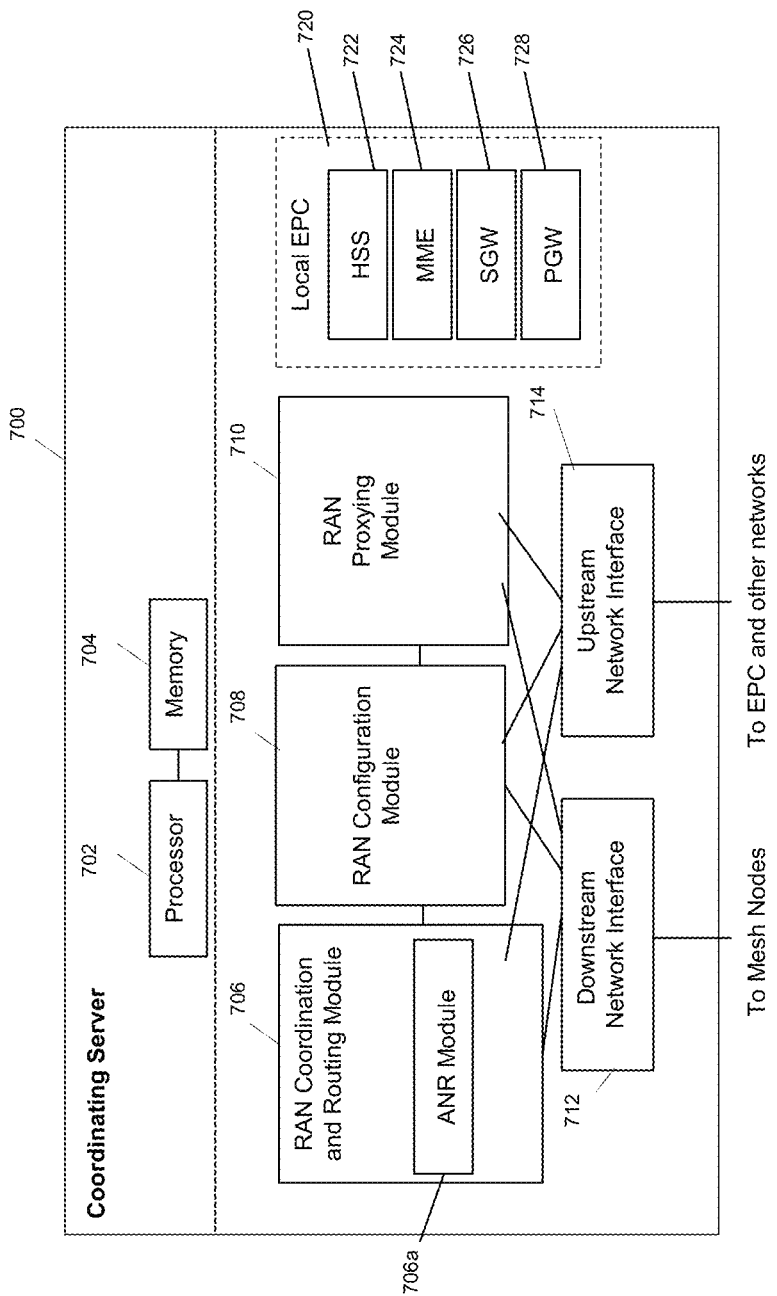
FIG. 7 is a coordinating server for providing services and performing methods as described herein, in accordance with some embodiments.

FIG. 7 is a diagram of a coordinating server for providing services and performing methods as described herein, in accordance with some embodiments. Coordinating server 600 includes processor 702 and memory 704, which are configured to provide the functions described herein. Also present are radio access network coordination/routing (RAN Coordination and routing) module 706, including ANR module 706a, RAN configuration module 708, and RAN proxying module 710. The ANR module 706a may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNodeB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl.

The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing Circuit Switch Fall Back (CSFB) with Radio Access Network (RAN) Information Management (RIM) without network support, comprising:
   receiving, by a coordinating server, direct information transfer System Information (SI) messages with RIM Packet Data Unit (PDU) from an eNodeB;
   sending, by the coordinating server, a RAN-information-request message to a relevant cell, using the routing information in the RIM PDU;
   collecting and replaying by the cell the SI needed for CFSB to the coordinating server;
   storing, by the coordinating server, the latest SI information per cell; and
   replaying, by the coordinating server, the eNodeB with the stored SI information using a MME direct information transfer S1 message.

2. The method of claim 1 wherein the cell is a 2G cell.

3. The method of claim 1 wherein upon boot, receiving by the coordinating server from the eNodeB, direct information transfer S1 messages with RIM PDU, a single message for each 2G neighbor in the eNodeB Neighbor Relation Table (NRT).

4. The method of claim 1 further comprising:
   sending, by the coordinating server, RAN-information-request message to the relevant 2G cell, using the routing information in the RIM PDU;
   replaying, by the 2G cell, the SI (System Information) needed for CFSB to the coordinating server; and
   storing, by the coordinating server, the latest SI information per 2G cell.

5. The method of claim 1 further comprising determining, by the coordinating server, when SI configuration changes and marking the cell status as SI fetch needed.

6. The method of claim 5 further comprising determining when the cell status is SI fetch not needed and replaying with the stored SI information using s direct information transfer SI message.

7. The method of claim 5 further comprising determining when the cell status is SI fetch needed and sending the RAN-information-request message to the relevant 2G cell.

8. The method of claim 1 further comprising receiving, at the coordinating server, SI needed for CFSB.

9. The method of claim 8 further comprising storing, by the coordinating server, the latest SI information per 2G cell.

10. The method of claim 9 further comprising replaying, by the coordinating server to the eNodeB, the stored SI information using an MME direct information transfer SI message.

11. A system for providing Circuit Switch Fall Back (CSFB) with Radio Access Network (RAN) Information Management (RIM) without network support, comprising:
   a coordinating server network device;
   wherein the coordinating server receives direct information transfer System Information (SI) messages with RIM Packet Data Unit (PDU) from an eNodeB;
   wherein the coordinating server sends a RAN-information-request message to a relevant cell, using the routing information in the RIM PDU;
   wherein the cell collects and replays the SI needed for CFSB to the coordinating server;
   wherein the coordinating server saves the latest SI information per cell; and wherein the coordinating server replays the eNodeB with the stored SI information using a MME direct information transfer S1 message.

12. The system of claim 11 wherein the cell is a 2G cell.

13. The system of claim 1 wherein upon boot the coordinating server receives from the eNodeB a direct information transfer S1 messages with RIM PDU, a single message for each 2G neighbor in the eNodeB Neighbor Relation Table (NRT).

14. The system of claim 1 further comprising:
wherein the coordinating server sends a RAN-information-request message to the relevant 2G cell, using the routing information in the RIM PDU;
receives from the 2G cell the SI (System Information) needed for CFSB; and
stores the latest SI information per 2G cell.

15. The system of claim 11 wherein the coordinating server determines when SI configuration changes and required and marks the cell status as SI fetch needed.

16. The system of claim 15 wherein the coordinating server determines when the cell status is SI fetch not needed and replays the stored SI information using s direct information transfer SI message.

17. The system of claim 15 wherein the coordinating server determines when the cell status is SI fetch needed and sends the RAN-information-request message to the relevant 2G cell.

18. The system of claim 11 further comprising receiving, at the coordinating server, SI needed for CFSB.

19. The system of claim 18 wherein the coordinating server stores the latest SI information per 2G cell.

20. The system of claim 19 wherein the coordinating server replays to the eNodeB the stored SI information using an MME direct information transfer SI message.

* * * * *